United States Patent [19]

Thompson, Jr.

[11] Patent Number: 4,667,433
[45] Date of Patent: May 26, 1987

[54] FISH HOOK SAFETY DEVICE

[75] Inventor: Joseph V. Thompson, Jr., Houston, Tex.

[73] Assignee: E-Zee Company, Inc., Pearland, Tex.

[21] Appl. No.: 643,487

[22] Filed: Aug. 23, 1984

[51] Int. Cl.[4] ............................................. A01K 97/06
[52] U.S. Cl. ...................................... 43/25.2; 43/57.1
[58] Field of Search ....................... 43/25.2, 54.1, 57.1

[56] References Cited

U.S. PATENT DOCUMENTS

| | | | |
|---|---|---|---|
| 867,439 | 10/1907 | Staehle | 43/25.2 |
| 2,285,888 | 6/1942 | Benton | 43/25.2 |
| 2,482,881 | 9/1949 | Sonner, Jr. | 43/57.1 |
| 2,616,209 | 11/1952 | Ploen | 43/57.1 |
| 2,685,756 | 8/1954 | Mowbray | 43/57.1 |
| 2,691,840 | 10/1954 | Smith | 43/25.2 |
| 2,829,461 | 4/1958 | Tuttle | 43/25.2 |
| 3,141,258 | 7/1964 | Mayer | 43/25.2 X |
| 3,224,134 | 12/1965 | Holcombe | 43/57.1 |
| 3,281,981 | 11/1966 | Dykhouse | 43/25.2 |
| 3,484,980 | 12/1969 | Wait | 43/25.2 |

FOREIGN PATENT DOCUMENTS 732817  4/1966  Canada ................................ 43/25.2

Primary Examiner—Nicholas P. Godici
Assistant Examiner—Carmine Cuda
Attorney, Agent, or Firm—Arnold, White & Durkee

[57] ABSTRACT

A fish hook safety device to safely and securely hold a hook whether single or gang while the hook is attached to a fishing line or stored in a tackle box for later attachment and use. The device has a sloping interior surface defined by the frustum of a right cone. The barbed and pointed ends of a hook rest on the sloping surface. The device accommodates a variety of hooks of different sizes and shapes.

17 Claims, 9 Drawing Figures

FISH HOOK SAFETY DEVICE

BACKGROUND OF THE INVENTION

This invention pertains to a fish hook safety device, and more particularly, to a device which may be used to safely retain different sized and shaped hooks including gang hooks.

Fishermen utilize different sized and shaped hooks depending on the particular fish sought. In some circumstances the fisherman may want to use a gang hook. This type of hook combines several hooks on one shaft which is connected to the fishing line. A common gang hook has three hooks equally spaced around the circumference of a circle and is called a treble hook.

Fishing hooks, by virtue of their design, snag or attach to almost anything coming into contact with the hook. The hook may attach to the fisherman himself or snag his clothes. Removal is difficult and perhaps painful. Also, many fishing boats, fishing docks, or cars transporting tackel, have carpet or carpet patches on the deck or other surfaces. Removal of hooks snagged in carpet is a time consuming and aggravating problem for a person about to enjoy a relaxing time fishing. Another problem occurs since often a fisherman will have several or more fishing rods grouped in his boat for use while fishing or grouped for transportation. Exposed hooks on a fishing line connected to a rod may become entangled in the fishing line of these other rods. Unsnarling and untangling hooks snagged in lines, clothes, carpet and even the fisherman is time consuming, difficult, and aggravating when what the fisherman really wants to do is to go fishing.

Thus, while hooks are in transit, use, or even storage, the fisherman must exercise caution in handling them to avoid these problems. To prevent accidental contact with fish hooks, anglers employ a variety of safety techniques or devices. A simple technique is to tautly attach the hook to a rod eyelet. When carrying a fishing pole with a hook attached to the fishing line, the fisherman may slip the hook through a rod eyelet and tautly wind the line. In this position, however, the hook remains exposed, and should the line loosen, the hook may become free of the eyelet and swing or fly around posing a danger to the fisherman or others. Gang hooks are exposed even more so. Previous patents describe several fish hook retaining devices which secure or store fish hooks with a view to preventing accidental contact with the hooks. U.S. Pat. No. 2,829,461 describes the use of a soft penetrable material which receives the barbed tips of a hook; transportation and handling may jiggle the hook free. U.S. Pat. No. 867,439 describes a star shaped arrangement of loops within which the hooks are encased. A clip arrangement receives the shank portion to retain the hooks within the loops, but the hooks may rotate away and out of the loops. U.S. Pat. No. 3,281,981 describes an arrangement which merely clamps onto the hook shank and secures the fishing lure to the fishing rod. However, the hook remains exposed. U.S. Pat. No. 3,484,980 describes a cylindrical retaining member having magnets to capture the metal lure or hook. Again, handling may bounce the hook free of this device or the lure weight may overcome the magnetic force and pull the hook out of the safety device. So, despite the efforts of the fisherman to secure his fish hook using these devices and techniques, the fish hook may nevertheless become free or otherwise exposed, and even the most careful fisherman is on occasion hooked by his own tackle. Even hooks loosely placed in tackle boxes pose a danger to the most careful fishermen.

It is therefore a feature of this invention to provide a fish hook safety device which attaches to a fishing rod and which also reduces the dangers and problems associated with a fish hook attached to a fishing line. Another feature of this invention is its ability to accommodate hooks of various sizes and shapes, and particularly treble or other gang hooks. Since most of a fisherman's hooks are held in a tackle box pending usage, it is a feature that this invention can be used or adapted for use in retaining or holding a gang fish hook while the hook is stored in a tackle box. Another feature of this invention is the increased protection from accidental contact with a fishing hook. Embodiments of the invention can be readily adapted for use directly on a fishing rod.

SUMMARY OF THE INVENTION

This invention comprises a device for securely holding hooks of various shapes and sizes, including both single and gang-type hooks. The device sheaths the hook it is holding so as to protect persons who may handle the device and prevent the hook from snagging persons, clothes, carpet, other materials or other fishing poles and tackle. In the preferred form suitable for use with a treble hook, the device is slotted to receive the shank of the hook within a central portion of the device. Once the shank is in this position, two of the hooks can be inserted in separate pockets, while the third hook can be housed in the slotted entry portion. Each one of two pockets preferably extends in a separate radial direction from the center of the device. Further, the radially inner wall surface of each such pocket is tapered outward from the inner wall surface to the outer wall surface. This conical-like surface is thus capable of housing treble hooks of various sizes.

An especially preferred form of the invention comprises a walled container in which the wall is longitudinally slotted sufficiently to accommodate the thickness of a hook shank and enable the shank of a hook to longitudinally enter inside the container. The container has a bottom, and a flexible attached pivotal cap or top having a semicircular closure skirt extending from the attachment point around the outer surface of the container and covering the entry slot. A disc connected to the skirt covers the open container's end. This device thus provides substantially total enclosure of the hook when within the container. The walls of the longitudinal entry slot preferably extend radially into the central axis of the container, thus penetrating both the wall and the bottom of the container. The central axis of the container is surrounded by an interior wall which together with the exterior wall defines an annular space for housing either single or gang hooks, especially treble hooks. The inner wall preferably slopes or tapers in an outward direction from the longitudinal center axis of the container towards its closed end periphery. Thus the inner wall surface preferably resembles the wall surface of the frustum of a cone. The axis of this conical section is a passageway, and the wall section is longitudinally slotted to provide access to the passageway.

A smaller diameter open ended cylinder intersects the closed end of the container, and extending substantially parallel with the longitudinal axis of the container, is located midway between the wall of the container and the container's central longitudinal axis. The wall of the container has a notch located radially in line with the smaller cylinder and extending longitudinally from the periphery of the open end of the container a sufficient distance so as to be an orifice through which the bend portion of the shank of a single hook may be inserted into the device.

The parts of the cap for the open end and the slot enclosure for the container are preferably parts of a single integral structure so that these two members can be operated in unison. A disc covers the open end while a skirt formed by a semicircular wall is connected to the periphery of the disc. One end of the skirt is hingedly attached to the exterior wall of the container. Protrusions on the interior face of the skirt engage notches in the exterior wall of the container so as to lock the cap in place. A protrusion on the exterior wall of the skirt at the end of the skirt remote from the hinge is used to push the cap open and closed.

An elongated flange like member is preferably attached to the external surface of the outer wall of the container to enable the container to be mounted directly on a fishing rod. The flange is preferably positioned away from the shank entry slot so as to avoid interference with the function of the slot and the skirt enclosure member.

As noted earlier, the interior wall structure of this embodiment of the invention preferably resembles the frustum of a cone. However, this inner wall surface in an alternative embodiment may be planar, parallel to the peripheral ends of the container and positioned anywhere between the two ends. The preferable embodiment of the device with a planar interior wall surface has that inner wall surface positioned approximately half way between the ends of the cylindrical container. An alternative interior surface may contain pockets radially disposed at approximately equal angles relative to one another. Each pocket in cross section would define a right triangle having its hypotenuse beginning at the edge of the pocket closest to the center and sloping towards the non-open peripheral end of the container. Longitudinally disposed, arcuately spaced flanges extend from the interior surface towards the open end. The flanges separate and define the pockets into which the hook tips are placed. The flanges restrict rotational movement of the hook. An alternative embodiment has a unitary body member whose cross section defines a rose curve, and particularly a three leafed rose curve. Each lobe of the body would have a pocket with an inner wall surface sloping away from the edge of the pocket opening closest to the center of the body toward the peripheral end of the body.

A variety of materials may be used in constructing the devices of the present invention. In general, the material should be corrosion resistant and strong enough to provide reliable service. Extrudable plastics are especially effective, particularly because they provide a relatively inexpensive means for forming the devices.

DETAILED DESCRIPTION OF THE DRAWINGS

Other features and advantages of the invention will become apparent upon reading the following detailed description in conjunction with the accompanying drawings, in which.

DETAILED DESCRIPTION OF THE PREFERRED EMBODIMENT

Figure 1:
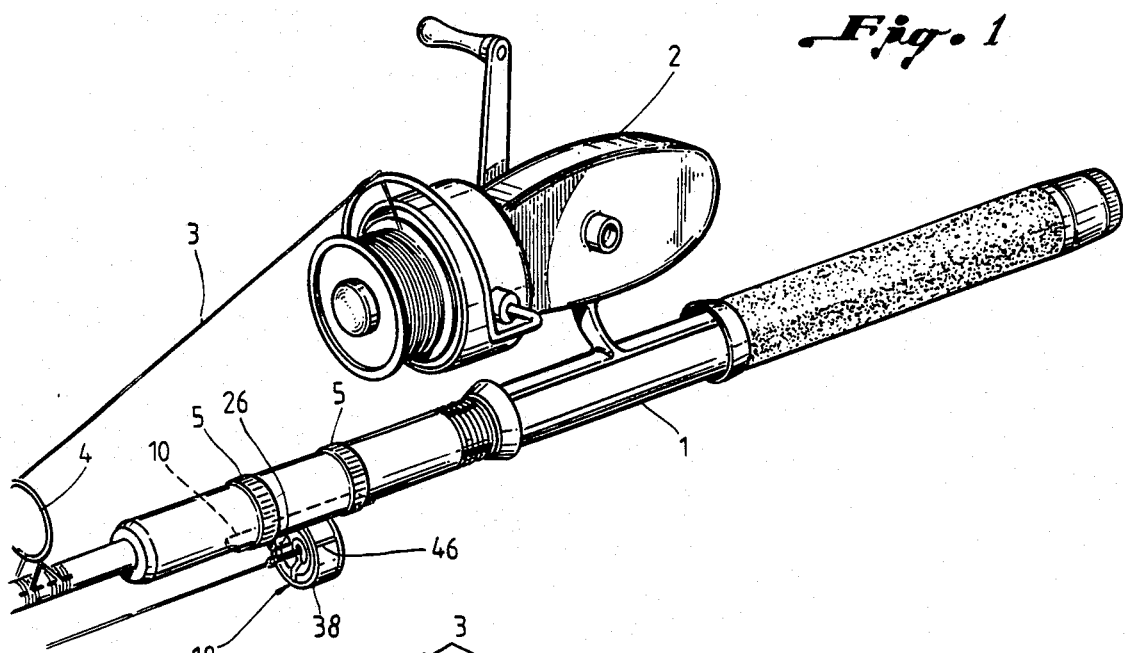
FIG. 1 is a perspective view showing a portion of a fishing rod, spinning reel, and hook storage device constructed in accordance with the teachings of the present invention, mounted on the fishing rod, and containing a treble hook.
Figure 2:
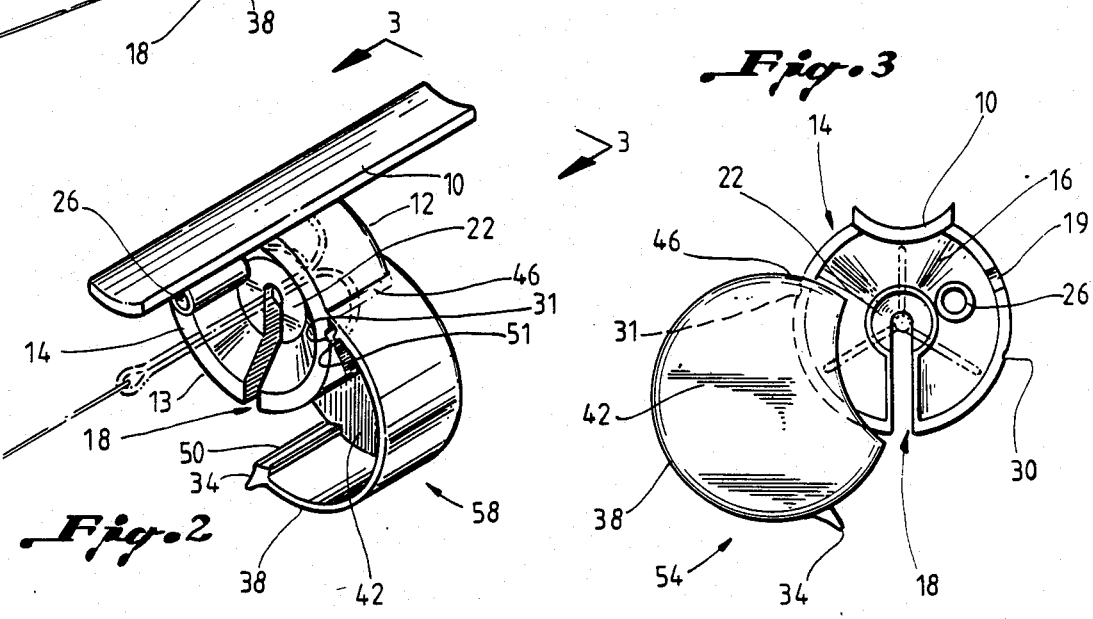
FIG. 2 is a front view of the preferred embodiment of the invention.
Figure 3:
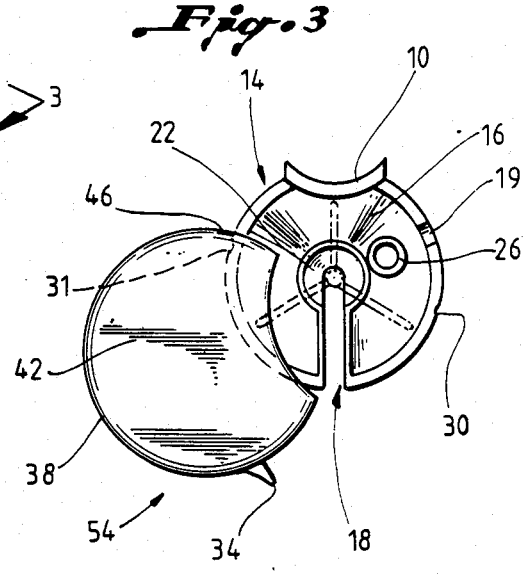
FIG. 3 is a cross-sectional view of FIG. 2 taken along the lines 3—3.
Figure 4:
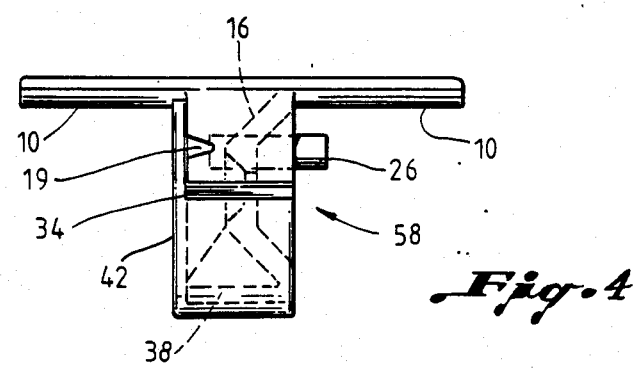
FIG. 4 is a side view of the preferred embodiment.

While the invention will be described in connection with a preferred embodiment, it will be understood that it is not intended to limit the invention to that embodiment. On the contrary, it is intended to cover all alternatives, modifications and equivalents as may be included in the spirit and scope of the invention as defined by the appended claims.

Referring to the drawings, the preferred embodiment comprises a cylindrical body or cylinder 14 with one open end 12. The closed end 13 is non-planar and is a conical structure 16 defined by a frustum of a right cone. The smaller diameter end 22 of the cone 16 is parallel to the planar ends of the cylinder and is positioned approximately midway between those ends. The surfaces of end 22 may be planar, indented, conical or a combination thereof. The preferred embodiment has a planar surface on the exterior surface of closed end 13 of container 14, with a conical surface facing the open end 12 of container 14. The cylinder 14 has a slot 18 extending radially from the exterior surface of the cylinder, through the inner surface 16 and to the center of the cylinder defined by surface 22. Preferably, a smaller diameter cylinder 26 is interconnected with and extends through sloped surface 16 substantially parallel with the longitudinal axis of the cylinder 14. The cylinder 26 extends a longer longitudinal distance then does the cylinder 14 so as to accommodate larger sized single hooks without the risk of exposing the sharp point of the hook.

The preferred embodiment has a self-locking cap 54 having two members to cover the open end 12 of the cylinder 14 as well as the slot opening 18. Disc member 42 covers the open end while a semicircular skirt 38 encloses the entry slot. The disk 42 connects along its periphery to the upper end of skirt 38. A hinge 46 flexibly attaches the cap 54 to the exterior surface of cylinder 14 at one end of the skirt 38. The semicircular skirt 38 has a radius slightly larger than the radius of cylinder 14 around which the skirt 38 may be removably wrapped or placed. Finger tap 34 protrudes from the exterior surface of skirt 38 and is located on the skirt 38 remote from hinge 46. Two linear protrusions 50 and 51 are located on the interior surface of skirt 38. One protrusion 51 is adjacent to hinge 46 and the other protrusion 50 is at the opposite end of semicircular skirt 38. These protrusions are positioned to interconnect with notches 30 and 31 in the exterior wall of cylinder 14 to lock the cap 54 on cylinder 14. Adjacent to but not covered by the semicircular skirt 38 is a notch 19 in the exterior wall of cylinder 14 located on a radial line with the smaller diameter cylinder 26.

A bowed elongated member 10 attaches to the exterior wall of cylinder 14 remote from slot 18. Part 10 has a concave surface to facilitate attaching the invention to a fishing rod. Several types of devices well known in the art, including tape and metal rings, may be used for this purpose.

To employ the invention for safely securing fish hooks, cap 54 is pushed up and away from cylinder body 14 by exerting pressure on protrusion 34. This releases interior protrusions 50 and 51 from notches 30 and 31. The cap 54 pivots away from the hook safety holding device 58 at pivot point 46 thus exposing the interior cavity of the hook holding device 58. The shank of the hook is placed within slot 18 defined by walls of the cylinder 14. The barb and point portions of the hook contact the interior face 16. If desired, one hook of a gang hook may be positioned within the slot 18 of cylinder 14. If a single hook is being positioned within the holding device through slot 18 or notch 19, its barbed end may be inserted in small cylinder 26 to more firmly hold and secure the hook. The cap 54 is locked into place by pushing protrusion 34 and pivoting the cap 54 across the open end of the cylinder until interior protrusions 50 and 51 engage with exterior notches 30 and 31.

As shown in FIG. 1, the container 58 attached to member 10 may be removably mounted to a fishing pole 1 by any number of means 5 well known in the art. After the device is mounted, a hook may be attached to line 3 extending through eyelet 4 from spool/reel attachment 2 also well known in the art. The hook may be securely held with container 58 posing little danger even if the spool should become slack.

Figure 5:
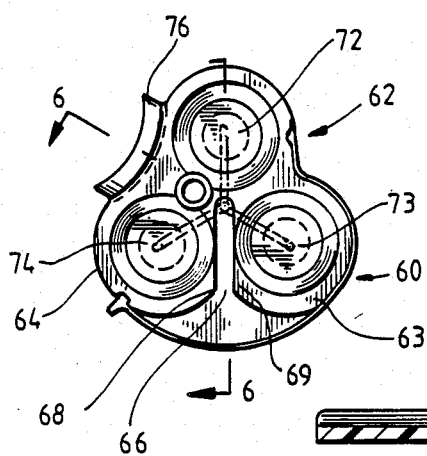
FIG. 5 illustrates an alternative embodiment having three body lobes and pockets in which the hook points may be placed.
Figure 6:
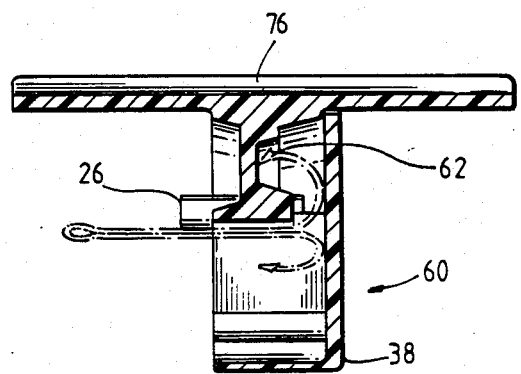
FIG. 6 is a side view of FIG. 5 taken along the line 6—6 of FIG. 5.

With reference to FIGS. 5 and 6, there is shown an alternate embodiment in accord with the teachings of the present invention. A unitary body member 60 has a substantially longitudinal axis. Three body lobes 62, 63, 64 extend radially from the longitudinal axis of the body member 60. A longitudinal slot 66 defined by flanges 68, 69, extends laterally from the outer wall surface of the body member 60 to the longitudinal axis of the body member 60. The longitudinal slot 66 is sized to enable the shank of a treble hook to be inserted through the slot to the longitudinal axis.

Each lobe 62, 63, 64 contains a radially disposed pocket 72, 73, 74 into which the barbed ends of a treble hook may be placed. Each pocket 72, 73, 74 extends longitudinally from the open end of the body member 60 into its respective lobe 62, 63, 64. The inner surface of the pocket 72, 73, 74 may be a sloping surface, a frusto-conical surface, or planar.

A longitudinally disposed flange 76 attaches to the exterior wall surface of the body member 60 between two of the lobes 62, 64. The flange is adapted to fit against a cylindrical fishing rod (not illustrated).

Figure 8:
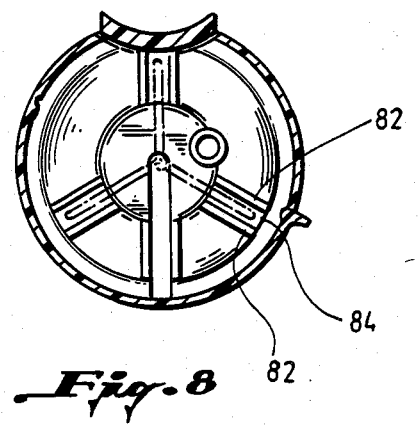
FIG. 8 is a front view of FIG. 7 taken along the line 8—8 of FIG. 7.
Figure 7:
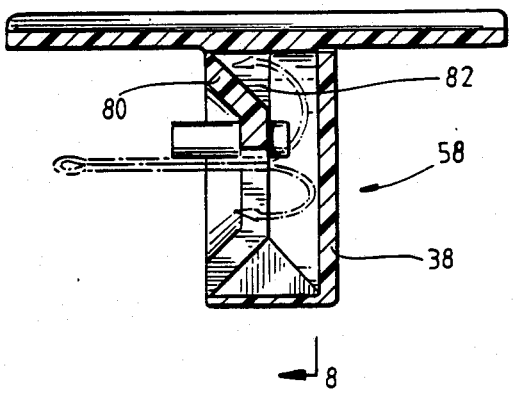
FIG. 7 is a side view of an alternate embodiment illustrating flanges extending from the partially closed end, which define pockets into which the hook tips may be placed.

Turning now to FIGS. 7 and 8, there is shown in cross-section a side view of an embodiment in which the interior surface 80 has longitudinally disposed, arcuately spaced flanges 82 extending towards the open end of the fish hook storage device 58. The flanges 82 separate and define pockets 84 into which the hook tips may be placed. The flanges 82 restrict rotational movement of the hook.

Figure 9:
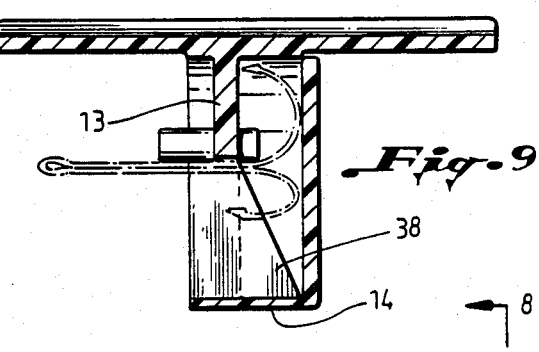
FIG. 9 illustrates an alternate embodiment having a partially closed end which is planar.

FIG. 9 illustrates an alternate embodiment constructed in accordance with the teachings of the present invention. The interior wall surface 13 of this embodiment is planar and parallel to the peripheral ends of the cylinder 14.

Thus it is apparent that there has been provided, in accordance with the invention, a fish hook safety holding device that fully satisfies the objects, aim and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the following claims.

What is claimed:

1. A fish hook safety storage device capable of housing a treble hook, comprising:
   a container having an open end for receiving a fish hook and a partially closed opposing end;
   the interior surface of said partially closed end sloping from the exterior periphery of said container's partially closed end towards said open end to define an open ended frustum of a right cone with its smaller open planar end substantially parallel to said open end of said container and positioned approximately midway between said container's open end and said opposing end of said container; and
   a cover adapted to close said open end and restrain said hook within said container.

2. A fish hook safety storage device as recited in claim 1 wherein said container is cylindrical.

3. A fish hook safety storage device as recited in claim 2 wherein said cylinder has a longitudinal slot extending radially from the exterior wall through said interior surface to the center of said cylinder.

4. A fish hook safety storage device as recited in claim 3 including retaining means connected to said container for removably attaching said device to a fishing rod.

5. A fish hook safety storage device as recited in claim 4 wherein said interior surface includes longitudinally disposed, arcuately spaced flanges extending from said interior surface towards said open end to define pockets into which the hook tips may be placed, the flanges restricting rotational movement of the hook.

6. A fishing device capable of housing a treble fishing hook, comprising:
   a unitary body member having a substantially longitudinal axis with three body lobes extending radially from said axis at substantially equal angles relative to one another, and having a longitudinal slot in said body member extending laterally from the outer wall surface of said body member substantially to said axis and sized to enable the shank of a treble hook to be inserted through said slot substantially to said axis;
   at least one of said lobes defining a radially disposed pocket extending longitudinally from a first end of said body member into its respective lobe and configured to house a separate hook of said treble hook; and
   a cap pivotally mounted to one of said body lobes to pivit between an opened position and a closed position and adapted to retain said hook in said body member.

7. A fishing device as recited in claim 6 in which one of said body lobes comprises radially extending arcuately spaced substantially parallel flanges defining said slot between said flanges.

8. A fishing device as recited in claim 7 in which the radially inner end of each said pocket is a sloping surface sloping outward from said first end.

9. A fishing device as recited in claim 8 in which said pocket surface is a frusto-conical surface.

10. A fishing device as recited in claim 9 including a longitudinally disposed flange attached to the exterior wall surface of said body member between two of said lobes, each of which lobes have a said pocket, the exterior wall surface of said flange being concave in transverse section to fit against a cylindrical fishing rod.

11. A fishing device capable of holding a treble fishing hook, comprising:
a housing having a concentric longitudinal axis and logitudinally disposed side walls enclosing said axis; said housing being open at a first end and having a bottom surface at its other end, said bottom surface either slopes inward from the periphery of said other end towards said axis and said first end;
a longitudinal slot in a said side wall extending the length of said housing and penetrating said housing including said bottom surface in a radial direction substantially to said longitudinal axis; and
a closure member pivotally mounted on said housing to pivot between an open position and a closed position and configured to close said open end of said housing when in said closed position.

12. A fishing device as in Claim 12 in which said side walls define a cylinder whose longitudinal axis is the longitudinal axis of said housing, and said bottom surface defines the wall surface of a right angle conical frustum whose base is at said other end.

13. A fishing device as recited in claim 12 in which said closure member includes a substantially circular cap.

14. A fishing device as in claim 13 in which said cap has a longitudinally extending skirt along its periphery configured to cover said slot in said side wall when in said closed position.

15. A fish hook safety device capable of housing a treble hook, comprising:
a cylindrical, hollow body member having an open end and a closed end, and having a longitudinal slot extending radially from the outer wall surface of said body to its longitudinal central axis;
the inner surface of said closed end of said body member sloping from the periphery of said closed end towards said central axis and said open end to define the surface of a frustum of a cone whose upper end is substantially parallel to the ends of said cylinder and positioned between said ends;
a cap hingedly attached to said outer wall of said body member, said cap including a disc portion to cover said open end of said body member and a semicircular skirt depending from the periphery of said disc portion positioned to cover the exterior of said body member including said slot;
two arcuately spaced protrusions on the interior surface of said semicircular cap;
two arcuately spaced notches in said exterior wall of said body member positioned to engage said protrusions in a locking manner upon closure of said cap;
a second open ended cylinder penetrating said closed end of said body member, said second cylinder being substantially parallel with the longitudinal axis of said body and located midway between the wall of said body member and said longitudinal axis;
a laterally bowed, elongated member for removably attaching said device to a fishing rod, said bowed elongated member fixedly attached along its convex surface to said body remote from said slot and said semicircular skirt; and
said outer wall having a notch on said body periphery at said open end and located radially in line with said second cylinder.

16. A fish hook safety storage device, comprising:
a container having an open end for receiving a fish hook and a partially closed end;
said partially closed end being a planar wall extending radially from the exterior periphery of said closed end towards the longitudinal axis of the container to a point intermediate said exterior periphery and the longitudinal axis of said container, and a second surface sloping from said intermediate point towards said open end to define a frustum of a right cone with its smaller planar end substantially parallel to said open end and positioned intermediate said open end and said partially closed end;
a longitudinal slot extending radially from the exterior wall through said partially closed end to said longitudinal axis of said container; and
a cover adapted to close said open end and said slot.

17. A fishing hook safety storage device as recited in claim 16, further comprising an elongated member adapted for removably attaching said container to a fishing rod, said elongated member connected to the outer surface of said container remote from said slot.

* * * * *

UNITED STATES PATENT AND TRADEMARK OFFICE
CERTIFICATE OF CORRECTION

PATENT NO. : 4,667,433
DATED : May 26, 1987
INVENTOR(S) : Joseph V. Thompson, Jr.

It is certified that error appears in the above-identified patent and that said Letters Patent are hereby corrected as shown below:

Column 1, line 21, delete "tackel" and insert --tackle--.

Column 7, line 35, delete "12" (second occurrence) and
      insert --11--.

Signed and Sealed this

Sixth Day of October, 1987

Attest:

DONALD J. QUIGG

*Attesting Officer*  *Commissioner of Patents and Trademarks*